United States Patent [19]

Burnell et al.

[11] Patent Number: 4,932,993

[45] Date of Patent: Jun. 12, 1990

[54] BATCH PRODUCTION OF SUSPENSION FERTILIZERS USING LIGNOSULFONATE

[75] Inventors: James R. Burnell, Sheffield; W. Keith Rylant, Florence, both of Ala.

[73] Assignee: Tennessee Valley Authority, Muscle Shoals, Ala.

[21] Appl. No.: 268,095

[22] Filed: Nov. 7, 1988

[51] Int. Cl.$^5$ ............................................... C05B 7/00
[52] U.S. Cl. ........................................ 71/35; 71/34; 71/43; 71/41; 71/64.08; 423/317; 423/305
[58] Field of Search .............. 71/34, 35, 41, 43, 64.08; 423/265, 305, 317, 315

[56] References Cited

U.S. PATENT DOCUMENTS

| | | | |
|---|---|---|---|
| 3,408,162 | 10/1968 | Sutterwhite et al. | 423/317 |
| 4,601,891 | 7/1986 | McGill et al. | 71/34 X |
| 4,846,871 | 7/1989 | Detroit | 71/41 X |

*Primary Examiner*—Ferris H. Lander
*Attorney, Agent, or Firm*—Robert A. Petrusek

[57] ABSTRACT

In the production of suspension fertilizers the addition of an additive comprising lignosulfonate to the wet-process acid prior to the ammoniation step prevents severe thickening of the suspension during its formation, which severe thickening is normally associated with in situ mass crystallization of monoammonium phosphate and which mass crystallization results in (1) the total prevention of further ammoniation of said acid or, at the very least, extremely slow further ammoniation thereof, and/or (2) excessive ammonia losses. Also, addition of said lignosulfonate to the acid prevents the formation of metallic impurity gel-like compounds which cause extremely high viscosities, nonpourability, and complete destruction of fluidity.

14 Claims, 1 Drawing Sheet

BATCH PRODUCTION OF AMMONIUM ORTHOPHOSPHATE
BASE SUSPENSION FERTILIZERS

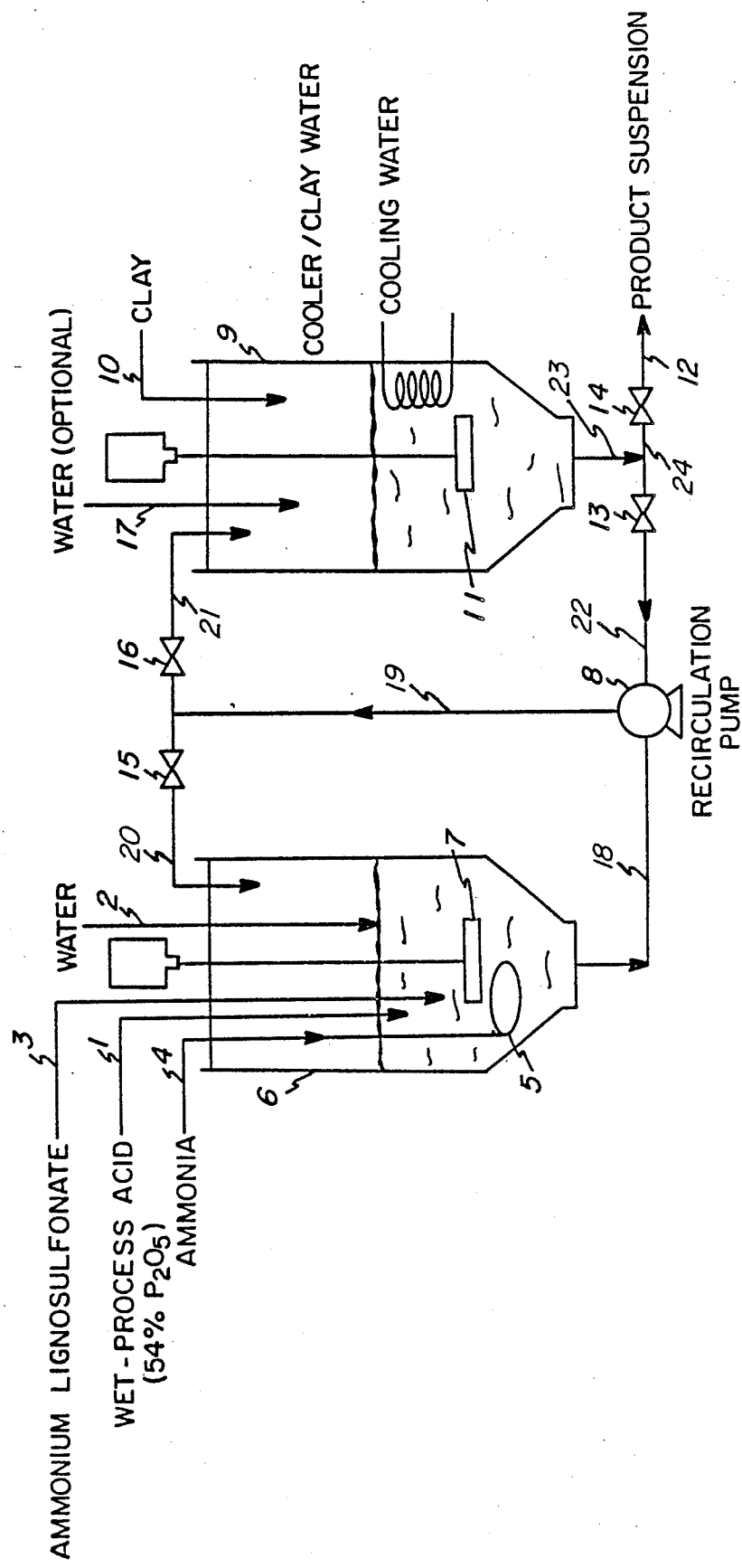
BATCH PRODUCTION OF AMMONIUM ORTHOPHOSPHATE BASE SUSPENSION FERTILIZERS

BATCH PRODUCTION OF SUSPENSION FERTILIZERS USING LIGNOSULFONATE

The invention herein described may be manufactured and used by or for the Government for governmental purposed without the payment to us of any royalty therefor.

INTRODUCTION

The present invention relates to an improved method for the production of high-analysis ammonium orthophosphate suspension fertilizers of high quality from low-cost impure raw materials by a simple, economical batch type process. In particular, the present invention relates to a novel, economical method for ammoniation of wet-process impure orthophosphoric acid, using a batch process resulting in production of high-analysis ammonium phosphate suspension fertilizers. More particular, the present invention relates to means and methods of the direct ammoniation of wet-process acids to produce high-grade suspension of high quality with excellent long-term storage characteristics such as low viscosity and high pourability by a simple, economical batch process.

BACKGROUND OF THE INVENTION

1. Field of the Invention

Heretofore, suspension fertilizers produced by the direct ammoniation of merchant-grade wet-process orthophosphoric acids in batch equipment were required to be of low grade because the acids had to be considerably diluted with water (i.e., from about 54% down to about 25-30% $P_2O_5$) prior to the ammoniation step to prevent severe thickening caused by a combination of excessive crystallization of monoammonium phosphate (MAP) and metallic impurity gel formation during the ammoniation step. Although pure mineral acids, such as for example, phosphoric acid theoretically have a pH of about 0, the commercial acids normally utilized in fertilizer production have initial pH's ranging anywhere between about 0.1 to about 0.5. These higher than theoretical initial or "bottom" pH's are due, at least in part, to the congeneric impurities in such impure acids. Also, heavy ammonia losses occurred if the acids were not of the proper dilution because the slurry would "set up" in the pH range of 2 to 4. Suspension fertilizers with such low analysis (such as 8-24-0) have a very distinct economic disadvantage as compared with higher analysis products because the costs of handling, freight, storage, and application are higher per unit of plant nutrient.

In order to obtain higher grades, the phosphoric acid had to be added to a heel from a previous batch equal to at least 33 percent of the total batch volume. The heel increased the pH and avoided severe complications caused by the excessive crystallization of monoammonium phosphate and metallic impurity gel formation during the ammoniation step. The use of a heel in this large volume percentage (33% or higher) of the total batch volume would be detrimental for batch-plant sizing and cycle times.

2. Description of the Prior Art

The art of producing fluid fertilizers, both liquids and suspensions, is well known and fully described in the literature.

The most common method of producing both liquid and suspension fertilizers containing nitrogen and phosphate is by the ammoniation of phosphoric acids or slurries of solid products derived therefrom, such as, for example, monoammonium phosphate. However, only in recent years was suitable technology developed for the production, from impure phosphoric acids or satisfactory concentrated orthophosphate suspension fertilizers, by methods which overcome the effect caused by the formation of the metallic impurity gel-like compounds, which compounds normally tend to destroy the fluidity of concentrated ammonium orthophosphate suspension fertilizers. Until the development of the latest technology, the only way known for increasing the fluidity of such orthophosphate suspensions was by means of dilution of same with water, which, of course, reduced the grades thereof.

In U.S. Pat. No. 3,019,099, Walters, Jan. 30, 1962, assigned to the assignee of the present invention, produced a low-analysis (8-24-0 grade) ammonium orthophosphate suspension fertilizer by both batch- and continuoustype ammoniation of wet-process orthophosphoric acids. In the preparation of this suspension fertilizer product, Walters recognized that the impurities in the acid imparted a thixotropic characteristic causing higher grade suspension fertilizers to be excessively viscous. Walters used the gel-like impurity compounds for prevention of sedimentation in his suspension fertilizer products. Later in U.S. Pat. Nos. 3,109,729, Slack et al., Nov. 5, 1963 and 3,113,858, Slack et al., Dec. 10, 1963, both assigned to the assignee of the present invention, produced NPK suspension fertilizers in which they added both polyphosphate, for increasing the grade, and clay as both a nucleating and suspending agent. In U.S. Pat. No. 3,813,233, Kendrick, May 28, 1974, assigned to the assignee of the present invention, fully described the techniques and conditions under which ammonia can be reacted with impure wet-process orthophosphoric acid without producing the gel-like impurity compounds that previously completely destroyed the fluidity of such high-grade orthophosphate suspension products. Kendrick's teachings were based primarily on ammoniation of the impure wet-process acid in two continuous stages or steps and, through the techniques he developed, he was able to make much higher grade products (e.g., 11-39-0 versus 10-30-0) with good flow characteristics and longer static storage life than had theretofore been possible. Kendrick also made similar products by a batch-simultaneous procedure which he indicated did not work quite as well as did his continuous process. However, when products that were made by Kendrick's teachings were shipped by rail, the solid portion of the suspensions settled and packed. The resulting packed crystals held tenaciously to the bottom of the railroad tank cars. In U.S. Pat. No. 4,066,432, Jones, Jan. 3, 1978, assigned to the assignee of the present invention, found that settling of the crystals changed the composition of the fluid, and the packed crystals could not be removed from the tank by ordinary procedures, thereby greatly reducing the value of the suspension fertilizer. Using this phenomenon, Jones developed a three-stage, continuous-type process for the production of satisfactory high-analysis suspension fertilizers (e.g., 13-38-0) by the ammoniation of wet-process orthophosphoric acid under conditions wherein gel-like impurity compounds were not formed. In the materials produced by the teachings of Jones supra, the resulting crystals did not settle and pack due to the application thereto of vibrational energy such as that which occurs during shipment by rail. In U.S. Pat. No. 4,511,388, Jones et al., Feb. 27, 1984, assigned to the assignee of the present invention, developed a batch-type process for production of satisfactory high-analysis suspension fertilizers (e.g., 13-38-0) by the direct ammoniation of impure wet-process orthophosphoric acid. The process developed by Jones et al. in '388 supra consisted of leaving a heel of hot product in the reactor from a previous batch equal to at least 33 percent of the total batch volume. The hot heel served to prevent severe thickening or near solidification due to mass crystallization of monoammonium phosphate salts in the pH region of about 2 to 4 during the ammoniation step and provided the nuclei and environment in the reactor for effecting the production of metallic impurity crystals instead of the gel-like impurity compounds which normally cause complete destruction of fluidity. However, until the present time, all efforts to produce high-analysis ammonium orthophosphate ($N:P_2O_5$) base suspensions (e.g., 12-36-0, 1.5% clay) with satisfactory physical properties by the direct ammoniation of wet-process orthophosphoric acid in simple, economical batch equipment, instead of the more expensive and more complicated batch procedure described by Jones in '388 supra, have been unsuccessful.

SUMMARY OF THE INVENTION

The present invention relates to an improved batch-type method for the production of high-analysis ($N:P_2O_5$) suspension fertilizers effected by the direct ammoniation of wet-process orthophosphoric acids or slurries of solids produced from such acids. The instant method involves the addition of a lignosulfonate, including water-soluble metal or ammonium salts of lignosulfonic acid, or both, such as for example calcium lignosulfonate, but preferably ammonium lignosulfonate, to the feed acid prior to the ammoniation step. The ammonium lignosulfonate (ALS), in essence, is a by-product of the paper industry and thereby plentiful and inexpensive. The ALS was obtained from about a 25 percent solution and contained 1.8 percent nitrogen and 3 percent sulfur. The lignosulfonate additive allows the wet-process acid to be directly ammoniated through the pH range of 2 to 4 without severe thickening or solidifying as mass crystallization of monoammonium phosphate occurs. The lignosulfonate additive also prevents metallic impurity gel-like compounds, which normally cause the complete destruction of fluidity in high-analysis orthophosphate suspensions, from forming during production and/or storage. Although lignosulfonates are known in the literature, no mention has been noted for use of ammoniation of wet-process orthophosphoric acid or improvement of the storage characteristics of suspension fertilizers.

OBJECTS OF THE INVENTION

It is therefore the principal object of the present invention to provide a simple, economical batch-type process for the production of high-analysis, high-quality orthophosphate suspension fertilizers from low-cost raw materials, such as ammoniation of wet-process or other impure phosphoric acids.

Another object of the present invention is to produce concentrated free-flowing suspension fertilizers by a simple, economical batch process that can be used by small or large fertilizer producers alike and can be operated under conditions that prevent mass crystallization of monoammonium phosphate that normally causes intolerable slowing down or stoppages in the ammoniation procedure.

A still further object of the present invention is to produce high-grade ammonium orthophosphate suspension fertilizers under conditions that prevent formation of gelatinous metallic impurity compounds, which compounds cause intolerably high viscosities, nonpourability, and complete destruction of the fluidity of concentrated ammonium orthophosphate suspension fertilizers during production and/or storage.

Still a further object of the present invention is to develop a process which economically produces high-grade orthophosphate suspension fertilizers from low-cost materials by a simple batch-type process without sacrifice in suspension quality, grade, or versatility.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWING

Our invention, together with further objectives and advantages thereof, will be better understood from a consideration of the following description taken in connection with the accompanying drawing and examples in which the single FIGURE is a flowsheet generally illustrating the principles of our new and novel process.

Referring now more specifically to the FIGURE, raw materials comprising wet-process or other impure phosphoric acids together with the necessary water of formulation and ammonium lignosulfonate, are fed from sources not shown via lines 1, 2, and 3 respectively, to reactor means 6. Ammonia from a source not shown is fed via line 4 and sparger 5 into reactor means 6. As shown, reactor means 6 is equipped with stirrer 7. The resulting reaction products in reactor means 6 are transferred with transfer means 8 from said reactor means to cooler-clay mixer means 9 wherein it is quickly cooled from a temperature ranging from about 150° to about 230° F. down to a temperature ranging from about 120° to about 140° F. As shown, clay is fed to cooler-clay mixer means 9 through line 10 and mixed with the aid of stirrer 11 and recirculated with transfer means 8 to gel same therein. Additional water of formulation, if required, can be fed through line 17. The final product suspension subsequently is discharged via line 12 for storage (not shown), shipment, or cold blending with potassium chloride and nitrogen solution for production of various $N-P_2O_5-K_2O$ suspensions for application to the soil. As shown, valves 13-16 along with appropriate and operatively connecting lines 18-24 allow for transfer of material from cooler-clay mixer means 9 to storage and for recirculating via pump 8 through the cooling and reaction loops. It should be obvious to those skilled in the art that the use of two vessels, as actually practiced in developing this invention, is not necessary. All the steps can be carried out sequentially in a single vessel such as used in "hot mix" batch suspension plants. It is merely necessary to wait until ammoniation is complete before starting the flow of cooling water in the cooling coils which would, of course, be located in reactor means 6 since no separate cooler-clay mixer means 9 would be used or needed.

DESCRIPTION OF THE PREFERRED EMBODIMENTS

In carrying out the objects of our invention in one form thereof, we have found that ammonium orthophosphate base suspension fertilizers with both high concentration and excellent physical properties can be produced by the direct ammoniation of impure wet-process orthophosphoric acids derived therefrom in a batch-type reactor containing a lignosulfonate additive, said additive including water-soluble metal or ammonium salts of lignosulfonic acid such as for example, calcium lignosulfonate, but preferably ammonium lignosulfonate added to said acid prior to the ammoniation step. We have found quite unexpectedly that the lignosulfonate additive serves as a "nucleation inhibitor" to prevent the normally encountered severe thickening or near solidification, due to mass crystallization of fertilizer salts (primarily monoammonium phosphate), in the pH range of about 2 to 4. We have found still further that the lignosulfonate additive prevents the metallic gel-like compounds from forming during production and/or storage. This is evidenced by the fact that the viscosity of the said produced ammonium orthophosphate suspensions decreased during their 60-day storage tests. Generally, metallic impurity gels would form in suspensions made by procedures outlined in the prior art that would completely destroy the fluidity of such suspension products. We have further discovered that the ammonium lignosulfonate additive is most effective as a "nucleation inhibitor" in the prevention of severe thickening or solidification of the resulting ammonium orthophosphate slurry as it is ammoniated through the pH range of about 2 to 4. This is evidenced by the fact that the loss of ammonia over the material in the reactor as it is ammoniated through the pH range 2 to 4, is negligible. The amount of lignosulfonate additive (normally added as a 25% weight percent solution) can be varied up to about 10 percent of the total batch weight; however, the most efficient and most effective amount is generally as little as 2 percent, and usually no more than about 5 percent of the total batch weight. This amount is very effective with most raw materials used and the grades of products produced. The cost of said lignosulfonates range from 1 to about 10 cents per pound and represents from about 20 cents to usually not more than about a few dollars per ton of product.

EXAMPLES

In order that those skilled in the art may better understand how the present invention may be practiced to effectively product high-grade orthophosphate suspension fertilizers with small crystals, good flow characteristics, and excellent storage properties, the following examples are given by way of illustration only and not necessarily by way of limitation.

EXAMPLE I

The tests comprising this example illustrate the differences in suspensions made by the normal batch-type process and batch-type process using a heel from ammonia and wet-process orthophosphoric acid with those prepared in accordance with the main embodiment of the present invention.

High-quality phosphate base suspensions of 12-36-0 grade containing 2 percent by weight of clay were produced by our new process by ammoniation of merchant-grade wet-process orthophosphoric acid derived from central Florida ore. The majority of the test work was carried out in a 50-pound batch pilot plant, while some tests were made in the laboratory on a smaller batch size scale. These suspensions were determined to be suitable for shipment and for long-term storage (6 months or longer). At this grade level, they are primarily intended for use in the subsequent production of various $N-P_2O_5-K_2O$ ratio mixed-grade suspension products by well known cold-blending procedures, but can be, if desired, applied directly to the soil.

The batch procedure for production of the base suspensions comprised the direct ammoniation of the acid using an additive of ammonium lignosulfonate. The amount of additive of ammonium lignosulfonate (an aqueous 25 weight percent solution) used in the tests was equal to about 5 percent of the total batch weight. The ammonium lignosulfonate allowed the merchant acid to be ammoniated through the pH range of about 2 to 4 without encountering severe complications caused by excessive crystallization of monoammonium phosphate. As ammoniation proceeded through this pH range of about 2 to about 4, no thickening or "set-up" of the slurry was evidenced nor was any ammonia loss noted due to the slurry being too thick; i.e., the slurry was fluid and easily handled during the entire batch cycle.

In the batch procedure, ammonium lignosulfonate, wet-process acid, and water of formulation were added to the reactor with stirring. The mixture was then rapidly ammoniated to a pH of about 6.8 after which the hot slurry (230° F.) was transferred to the cooler-clay mixer. In the cooler-clay mixer, the slurry was quickly cooled to the range of 120° to 140° F. for production of an abundance of small monoammonium and diammonium phosphate crystals required for prevention of excessive crystal growth during storage. About 2 percent by weight of attapulgite clay was added to the slurry (120° to 140° F.) and gelled with a turbine-type agitator and recirculation pump to suspend the crystals. The total time required in these tests for the production of a 50-pound batch was about 25 to 30 minutes.

The resulting product suspensions are compared in Table I infra along with similar suspensions that were produced by a batch-type process according to the teachings of Jones ('388 supra) as well as with suspensions of highest possible satisfactory grade produced by the normal prior art type single-stage batch process.

Satisfactory base suspension fertilizers are required to have viscosities that do not exceed the limits of 1,000 centipoises at 80° F. and 1,500 centipoises at 32° F. when measured with a Brookfield viscometer (Model RVT). They are also at least 98 percent pourable in one minute at both 80° and 32° F. and contain no large (+20 mesh-850 micrometers) crystals. NOTE: Any references made herein to materials and/or apparatus which are identified by means of trademarks, tradenames, etc., are included solely for the convenience of the reader and are not intended as, or to be construed, an endorsement of said materials and/or apparatus.

TABLE I

Phosphate Base Suspension Fertilizers Made by Batch Ammoniation of Wet-Process Orthophosphoric Acid[a] Comparison of Products Made by Our New Batch Procedure[b] With Those Made Using Our Prior Art Procedure

| Test No. | Grade[c] | Initial viscosity[d] at 80° F., cP | After 30-day storage at 80° F. Viscosity,[d] cP | After 30-day storage at 80° F. Pourability,[e] % by volume |
|---|---|---|---|---|
| Batch-type process of the instant invention | | | | |
| 1 | 12-36-0 | 600 | 430 | 100 |
| 2 | 11-37-0 | 600 | 550 | 100 |
| 3 | 11-35-0 | 340 | 250 | 100 |
| Batch-type process using a heel[f] | | | | |
| 4 | 13-38-0 | 650 | 600 | 100 |
| 5 | 12-36-0 | 300 | 350 | 100 |
| Normal batch-type process[g] | | | | |
| 6 | 12-36-0 | 1400 | —[h] | 0 |
| 7 | 11-33-0 | 800 | —[h] | 0 |
| 8 | 10-30-0 | 300 | 450 | 100 |

[a]Derived from Central Florida phosphate ore. Contained 53.3% $P_2O_5$, 3.8% $SO_4$, 1.6% $Al_2O_3$, 1.6% $Fe_2O_3$, 0.9% MgO, 1.1% F, and 0.7% CaO.
[b]Process consisted of equipment shown in the FIGURE.
[c]Suspensions in tests 1 and 3 contained 2% by weight of clay; in tests 2, 4, 5, 6, 7, and 8, products contained 1.5% by weight of clay.
[d]Suspensions were mixed 5 minutes with a propeller-type stirrer operating at a tip speed of 7 ft/s before measurements were made.
[e]After agitation supplied by gently rotating a stirring rod twice around the inside of container.
[f]Process described by Jones ('388 supra) in which the heel supplied about 33% of the total reactor volume.
[g]Single-stage ammoniation process; batch time was about 25 minutes.
[h]Products "set up" during storage.

The results shown in Table I supra clearly indicate that the high-quality suspensions produced by our new batch process are about equal in grade and quality to those prepared by the more costly and involved batch process utilizing a heel (tests 4 and 5) and are significantly superior in grade and quality to those produced by the usual single-stage batch process (tests 6, 7, and 8).

EXAMPLE II

Phosphate base suspension fertilizers of 12-36-0 grade and, 2 percent clay, were produced by our new batch-type procedure from merchant-grade wet-process orthophosphoric acid derived from central Florida ore as described in Example I above. The formulation and operating conditions for production of such grade with good physical properties are shown in Table II infra. The physical properties both before and after 60 days of storage at 80° and 100° F. are shown in Table III infra for the product made by our new batch-type procedure. This example illustrated that 12-36-0 grade suspensions made by our new batch-type procedure were entirely satisfactory for direct application to the soil, for use in production of mixed suspension fertilizers (NPK) with various ratios and grades, and for long-term storage.

TABLE II

Operating Conditions for Production of 12-36-0, 2% Clay, Suspension Fertilizers from Merchant-Grade Wet-Process Orthophosphoric Acid by the Instant New Batch-Type Procedure

| Batch reactor feed, lb (kg) | | |
|---|---|---|
| Ammonium lignosulfonate[a] | 25 | (11) |
| Water | 117 | (53) |
| WPA (54% $P_2O_5$) | 333 | (151) |
| Ammonia | 73 | (33) |
| Temperature (boiling),[b] °F. (°C.) | 230 | (110) |
| Agitator tip speed, ft/s (m/s) | 33 | (10) |
| Mixing time, min | 15 | |
| Cooler | | |
| Temperature,[c] °F. (°C.) | 130 | (54) |
| Clay added, lb (kg) | 10 | (4.5) |
| Agitator tip speed, ft/s (m/s) | 33 | (10) |
| Mixing time, min | 10 | |
| Product (12-36-0, 2% clay) | | |
| Batch size, lb (kg) | 500 | (227) |
| Total batch time, min | 25 | |
| pH | 6.8 | |
| Specific gravity at 80° F. (27° C.) | 1.47 | |
| Temperature (as sent to storage), °F. (°C.) | 100 | (38) |
| Initial viscosity,[d] cP (Pa•s) | | |
| 80° F. (27° C.) | 600 | (0.6) |
| 32° F. (0° C.) | 1100 | (1.1) |
| Initial pourability,[e] % by volume | | |
| 80° F. | 100 | |
| 32° F. | 100 | |
| Initial crystal size,[f] μm | 625 | |

[a]Weight of ammonia lignosulfonate fed as 25% solution, weight basis. ALS contained 1.8% N and 3% S.
[b]Highest temperature to which the mixture reached during addition of anhydrous ammonia. Water loss due to boiling was about 58 pounds (26 kg).
[c]Temperature to which suspension is cooled before addition of clay.
[d]Measurements after agitating sample for 5 minutes with a propeller-type stirrer operating at a tip speed of 7 ft/s.
[e]Measurements after agitation supplied by gently rotating a stirring rod twice around the inside of the container.
[f]Limit, 850 μm (20 mesh).

TABLE III

Physical Properties of 12-36-0, 2% Clay, Suspensions Made by Instant New Batch-Type Procedure from Wet-Process Orthophosphoric Acid (54% $P_2O_5$)[a] Derived from Central Florida Ore

| Grade | Initial viscosity[b] at 80° F. cp | After quiescent storage for 60 days 80° F. Viscosity[b] at 80° F. cp | After quiescent storage for 60 days 80° F. Pourability,[c] % by vol | After quiescent storage for 60 days 100° F. Viscosity[b] at 80° F. cP | After quiescent storage for 60 days 100° F. Pourability[c] % by vol |
|---|---|---|---|---|---|
| 11.6-35.8-0 | 600 | 440 | 100 | 430 | 100 |

[a]Contained 53.3% $P_2O_5$, 3.8% $SO_4$, 1.6% $Al_2O_3$, 1.6% $Fe_2O_3$, 0.9% MgO, 1.1% F, and 0.7% CaO.
[b]Suspensions were mixed 5 minutes with a propeller-type stirrer operating at a tip speed of 7 ft/s before viscosity measurements were made.
[c]Measurements after agitation supplied by gently rotating a stirring rod twice around the inside of the container.

EXAMPLE III

Several tests were made to determine the optimum level of ammonium lignosulfonate (ALS) required to give a satisfactory operation and yield an acceptable product with good storage characteristics. In making the tests, variables such as the product grade, acid impurity level, N to $P_2O_5$ weight ratio, and retention time (production time) that are known to have effects on viscosity and pourability were kept constant throughout the series. The product grade in all cases was 11-37-0 containing 2 percent clay and the production time was 20 minutes. The amount of ALS added was varied in amounts up to 10 weight percent.

Results obtained from these tests, shown in Table IV infra, indicate that the most preferred level of ALS added ranged from 3 to 5 weight percent as determined by viscosity and pourability measurements for both satisfactory operation and storage of the suspensions, as made by the procedure shown in Example I, supra. Suspensions containing less than 3 and more than 5 weight percent ALS were either unsatisfactory because of high viscosity (>1000 cP) or low pourability (<98% by volume).

TABLE IV

Production of 11-37-0 Grade 2% Clay Suspension Fertilizers from Central Florida Wet-Process Orthophosphoric Acid[a] - Effect of Ammonium Lignosulfonate[b] Added on Quality of Suspension Product as Shown by Viscosity and Pourability Measurements

| ALS[b] % by wt. | As Produced (80° F.) | | After 30 days of Storage | | |
|---|---|---|---|---|---|
| | Viscosity[c] cP | Pourability[d] % by vol. | Evaluation Temp., °F. | Viscosity[c] cP | Pourability[d] % by vol. |
| 0 | 900 | 100 | 80 | 1600 | 50 |
| | | | 100 | >2000 | 0 |
| 1 | 700 | 100 | 80 | 900 | 100 |
| | | | 100 | >2000 | 0 |
| 2 | 600 | 100 | 80 | 850 | 100 |
| | | | 100 | 1400 | 100 |
| 3 | 600 | 100 | 80 | 500 | 100 |
| | | | 100 | 850 | 100 |
| 4 | 650 | 100 | 80 | 500 | 100 |
| | | | 100 | 850 | 100 |
| 5 | 650 | 100 | 80 | 600 | 100 |
| | | | 100 | 850 | 100 |
| 7 | 700 | 100 | 80 | 600 | 100 |
| | | | 100 | 900 | 75 |
| 10 | 750 | 100 | 80 | 650 | 100 |
| | | | 100 | 850 | 50 |

[a]Contained 53.4% $P_2O_5$, 2.1% $Al_2O_3$, 1.8% $Fe_2O_3$, 0.7% MgO, 1.2% F, 0.20% CaO, and 3.8% $SO_4$.
[b]25% solution by weight basis. Contained 1.8% N and 3% S.
[c]Suspensions were agitated for 5 minutes before measurements were made.
[d]After agitation supplied by gently rotating a stirring rod twice around the inside of the container.

INVENTION PARAMETERS

After sifting and winnowing through the data supra, as well as other results and operations of our new, novel, and improved technique, including methods and means for the effecting thereof, the operating variables, including the acceptable, the preferred conditions, and the most preferred conditions for carrying out our invention are summarized below.

| | Operating Range | Preferred | Most Preferred |
|---|---|---|---|
| Reactor[a] | | | |
| Acid concentration, % $P_2O_5$, by wt. | 38–54 | 48–54 | 52–54 |
| Temperature, °F. | 200–230 | 220–230 | 225–230 |
| Lignosulfonate,[b] % by wt. | 1–10 | 2–8 | 4–5 |
| Retention time, min | 5–30 | 10–20 | 10–15 |
| N:$P_2O_5$ weight ratio | 0.31:1–0.38:1 | 0.32:1–0.36:1 | 0.32:1–0.34:1 |
| Agitator tip speed, ft/s | 10–90 | 20–50 | 30–50 |
| pH (diluted 1:9 with $H_2O$) | 6.0–7.2 | 6.5–7.0 | 6.8–7.0 |
| Cooler-Clay Mixer[c] | | | |
| Temperature, °F.[d] | 100–140 | 120–140 | 130–140 |
| Retention time, min | 5–30 | 5–20 | 5–10 |
| Clay added, % by weight | 1–2.5 | 1.5–2.5 | 2 |
| Agitator tip speed, ft/s | 10–90 | 20–50 | 30–50 |

[a]In production of suspension, the acid, water of formulation, and ammonium lignosulfonate are added to the reactor and ammoniated as quickly as possible. No odor of ammonia or thickening of the slurry was evidenced during the operation.
[b]Ammonium lignosulfonate preferred.
[c]In the second embodiment, no separate cooler-clay mixer means is utilized and these condition are effected in the reactor means subsequent to the ammoniation of the feed acids or derivatives thereof.
[d]For production of an abundance of ammonium phosphate crystals, the temperature of the cooler should not exceed about 140° F.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A batch-type process for the production of relatively high grade suspension-type fertilizers containing from about 10 to about 12 weight percent N and from about 30 to about 36 weight percent phosphorus, said phosphorus expressed as $P_2O_5$, said suspensions produced from ammonia and wet-process phosphoric acid, which suspensions have high plant food contents, excellent flow properties, low viscosities, good storage properties, and do not contain settled crystals after exposure to substantial vibration, which process comprises the steps of:

(a) introducing into reactor means a stream of predetermined quantities of impure wet-process orthophosphoric acid containing from about 38 to about 54 weight percent $P_2O_5$ and having an initial pH of about 0.1;

(b) introducing into said reactor means a stream of water-soluble metal or ammonium salts of lignosulfonic acid, or both, in amounts ranging from about 1 to about 10 percent of the total batch weight;

(c) introducing into said reactor means a stream of the requisite amount of water of formulation predetermined necessary to yield the desired product suspension grade;

(d) subsequently introducing into said reactor means a stream of anhydrous ammonia in predetermined amounts necessary to effect at least a partially ammoniated feed phosphoric acid material therein, said material having a N:$P_2O_5$ weight ratio from about 0.31:1 to 0.38:1 and a pH ranging from between about 6.0 and about 7.2;

(e) maintaining the materials in said reactor means at a temperature in the range from about 200° to about 230° F. and retaining same therein from a time ranging from about 5 to about 30 minutes;

(f) removing from said reactor means at least a portion of the resulting at least partially ammoniated material and introducing same into cooler-clay mixer means wherein the temperature of the materials introduced thereinto is rapidly cooled to the range from about 100° to about 140° F.;

(g) maintaining the resulting cooled material in said cooler-clay mixer means for a period of time ranging from about 5 to 30 minutes;

(h) introducing predetermined portions of clay into said cooler-clay mixer means;

(i) maintaining said clay introduced in step (h) supra in continuous and intimate contact with the material therein; and (j) removing the resulting product suspension from said cooler-clay mixer means for ultimate use in the production of NPK suspension mixtures, storage, or direct application;

said process characterized by the fact that the ammoniation of said phosphoric acid in step (d) is direct, continuous, and complete throughout the pH range from about 0.1 to about 7.2, and further characterized by the fact that no substantial change in viscosity of said at least partially ammoniated feed acid is effected as the pH thereof is increased through the range of between about pH 2 and about pH 4, and still further characterized by the fact that no substantial mass crystallization of monoammonium phosphate salts is effected as said pH is increased through said pH range of between about 2 to about 4.

2. The process of claim 1 wherein the amounts of ammonia introduced into step (d) thereof effects a $N:P_2O_5$ weight ratio ranging from about 0.32:1 to about 0.36:1 and effects raising the initial pH of said feed acid of about 0.1 up to the range of from about 6.5 to about 7.0.

3. The process of claim 2 wherein the amounts of ammonia introduced effects a $N:P_2O_5$ weight ratio ranging from about 0.32:1 to about 0.34:1 and effects raising said initial pH of said feed acid up to the range of from about 6.5 to about 6.8.

4. The process of claim 1 wherein the amount of lignosulfonate added to step (b) ranges from about 2 to about 8 weight percent.

5. The process of claim 4 wherein the amount of lignosulfonate added ranges from about 3 to about 5 weight percent.

6. The process of claim 2 wherein the amount of lignosulfonate added ranges from about 2 to about 8 weight percent.

7. The process of claim 6 wherein the amount of lignosulfonate added ranges from about 3 to about 5 weight percent.

8. The process of claim 3 wherein the amount of lignosulfonate added ranges from about 2 to about 8 weight percent.

9. The process of claim 8 wherein the amount of lignosulfonate added ranges from about 3 to about 5 weight percent.

10. The process of claim 1 wherein said lignosulfonate is ammonium lignosulfonate.

11. The process of claim 2 wherein said lignosulfonate is ammonium lignosulfonate.

12. The process of claim 3 wherein said lignosulfonate is ammonium lignosulfonate.

13. The process of claim 1 for preparing a 12-36-0 grade suspension fertilizer wherein the final $N:P_2O_5$ weight ratio of product suspension in said reactor means is in the range from about 0.32:1 to about 0.34:1.

14. The process of claim 1 for preparing a 10-34-0 grade suspension fertilizer wherein the final $N:P_2O_5$ weight ratio of product suspension in said reactor means is in the range from about 0.28:1 to about 0.30:1.

* * * * *